United States Patent [19]

Jaisle et al.

[11] 4,267,240

[45] May 12, 1981

[54] RELEASE SHEETS AND PROCESS OF USE

[75] Inventors: Richard F. Jaisle, Batesville, Ind.; Kenneth D. Bunkowski, Cincinnati, Ohio

[73] Assignee: Formica Corporation, Cincinnati, Ohio

[21] Appl. No.: 144,081

[22] Filed: Apr. 28, 1980

Related U.S. Application Data

[62] Division of Ser. No. 93,414, Nov. 13, 1979.

[51] Int. Cl.³ .................. B32B 21/06; B32B 27/04; B32B 29/06
[52] U.S. Cl. ........................... 428/484; 106/2; 156/288; 156/289; 156/344; 427/414; 428/537; 428/524; 428/531
[58] Field of Search ............... 156/288, 289, 323, 344; 428/40, 352, 530, 531, 537, 484; 106/2; 427/414

[56] References Cited

U.S. PATENT DOCUMENTS

| | | | |
|---|---|---|---|
| 3,050,434 | 8/1962 | Emily et al. | 156/344 |
| 3,215,579 | 11/1965 | Hagen | 156/289 |
| 3,387,998 | 6/1968 | Powers | 428/537 |
| 3,438,794 | 4/1969 | Ritson et al. | 106/2 |
| 4,166,150 | 8/1979 | Mattor et al. | 156/289 |

*Primary Examiner*—Jerome W. Massie
*Attorney, Agent, or Firm*—Frank M. Van Riet

[57] ABSTRACT

A novel release sheet comprising a web of paper having a water absorption of at least about 200 seconds which has been sized on at least one side thereof with a water-soluble, alkaline earth or earth metal salt, e.g. a calcium salt such as calcium chloride and then coated on said sized side with a film of a mixture of a salt of alginic acid, such as sodium alginate, and either (1) a triglyceride or (2) hydrolyzed or non-hydrolyzed lecithin, and a method of producing decorative laminates therewith.

11 Claims, No Drawings

RELEASE SHEETS AND PROCESS OF USE

CROSS-REFERENCE TO RELATED APPLICATION

This application is a division of our copending application Ser. No. 93,414, filed November 13, 1979 and entitled An Improved Process For Releasing Laminates.

BACKGROUND OF THE INVENTION

When making laminates, it is conventional to utilize a plurality of resin-impregnated core sheets. The sheets employed for this purpose are usually prepared from cellulosic fibers, e.g. creped or uncreped kraft paper and the like. In common practice, the fibrous core sheet material, in the form of a continuous sheet is first impregnated with resin, usually a thermosetting synthetic resin and, more particularly, in the case of cellulosic core sheets, a thermosetting phenolic resin such as a phenol-formaldehyde resin, a cresol-formaldehyde resin or the like. The resin-impregnated core sheet material is then dried to a desired volatile content and finally cut to the appropriate size.

Oftentimes, laminates are prepared solely from a plurality of these resin-impregnated core sheets stacked in superimposed relationship, and the number of plies in the stack will depend on the use for which the laminate is intended. In most cases, however, one or more decorative overlayments are placed on top or on both top and bottom of such a core assembly prior to lamination.

Thus, for example, in preparing a conventional decorative laminating assembly, a print sheet, which usually comprises a single, resin-impregnated sheet of an absorbent high alpha-cellulose or regenerated cellulose paper or similar fibrous material bearing an ornamental design or dyed or pigmented to impart a solid color thereto, is placed on top of the core member, which in this case generally contains 5 to 8 plies. A protective overlay sheet, which is usually similar to the print sheet except for being undecorated, is then usually placed over the print sheet.

The resins used to impregnate the print and overlay sheets are generally thermosetting synthetic resins such as aminotriazine-aldehyde, e.g. melamine formaldehyde which do not develop any significant amount or undesirable discoloration when subjected to laminating temperatures.

Similarly, metal clad laminates are obtained from assemblies wherein a thin metal sheet or foil, e.g. a copper, an aluminum, a steel, and alloys such as brass is placed on top of the core member.

Laminating assemblies of this type may be individually laminated by application of heat and pressure thereto; however, for obvious economic reasons, it is common practice to consolidate a plurality of these individual laminating assemblies into one large assembly or press pack and then to laminate this pack in one operation.

Where individual laminating assemblies containing, besides the core member, overlayments such as those described above are concerned, and also where it is desired to obtain laminates having one major surface either smooth or textured and free of defects from a plurality of core sheets as the sole laminae, the press pack will be built from these individual laminating assemblies placed back-to-back.

In building such a pack, an individual laminating assembly is placed with its overlayment surface adjacent to a press plate. The core members are then placed on the overlayment and another individual laminating assembly is then positioned back-to-back with the first assembly, with one or two separator sheets being placed between the core members of the individual assemblies. Another polished press plate is placed on the second individual assembly adjacent to its overlayment surface. Thus, at this point, the pair of laminating assemblies can be considered as being in mirror image relationship between the press plates, separated only by the separator sheet(s).

In its simplest embodiment, to back-to-back press pack would consist of this arrangement of one pair of individual laminating assemblies between their core members. In actual commercial practice, however, the entire procedure is usually repeated many times, until a pack having the desired height has been built. The press pack is then subjected to heat and pressure by inserting it into a laminating press, to consolidate the individual laminating assemblies into unitary structures. When the press pack is removed from the laminating press, the resulting pairs of laminates, pressed back-to-back are removed from between the press plates and then separated from one another at the locus of the separator sheet(s).

As previously indicated, this multiple laminating method affords definite economic advantages. However, as oftimes practiced commercially, it also has certain inherent disadvantages. Foremost among these is the fact that in order to be truly effective, the required separator sheet must, in many cases, be prepared from relatively costly materials. A partial solution to this problem is described in U.S. Pat. No. 3,050,434 to Emily et al. which discloses a separator sheet comprising a web of paper coated with a film of a salt of alginic acid. It has been found that while such sheets may sometimes result in a satisfactory laminate release, more times than not the release will be unsatisfactory. The deficiency of such sheets results from the fact that the paper completely absorbs the alginic salt so that very little, if any, remains on their surface. Application of large amounts of alginic salt does not appear to improve the frequency of inferior releases.

A later advance in the art was made as described in U.S. Pat. No. 3,215,579 to Hagen. This patent discloses that a paper web, and particularly a saturating kraft paper web, can be inexpensively made into a separator sheet by first sizing the web with an aqueous solution of a water-soluble alkaline earth or earth metal salt and then coating the sized web on at least one side, i.e. with a film of a salt of alginic acid.

Although superior to the alginic salt alone, the sized release sheet also absorbs a great deal of sizing agent and alginic salt so that it, too, frequently results in an inferior release when used to separate decorative laminates undergoing consolidation. Large amounts of alginic salt, even applied in sequential layers does not improve these deficiencies. Only by incorporating a phenolic resin was Hagen able to produce a satisfactory release sheet. The use of such a resin, before sizing, is very costly.

SUMMARY OF THE INVENTION

It has now been discovered that an effective separator sheet for releasing laminates in a back-to-back press pack from one another can inexpensively be made by first coating a paper web having a water absorption of at least 200 seconds with an aqueous solution of a water-soluble alkaline earth or earth metal salt, then coating the same surface with a film which is comprised of a salt of alginic acid and a small amount of a triglyceride, lecithin or hydrolyzed lecithin. The inventive concept hereof resides both in the utilization of a paper having a high water absorption, and the use of the mixture of the alginate and the triglyceride or lecithin or hydrolyzed lecithin such that as the salt sizing and alginate mixture coatings are applied to the surface of the paper, substantially all of each coating is retained on the surface fibers thereof and substantially no penetration into the web occurs. Thus, there is obtained a thin, uniform, smooth release layer on top of the paper web thereby creating an effective, release separating sheet.

BACKGROUND OF THE INVENTION INCLUDING PREFERRED EMBODIMENTS

According to the instant invention, there is disclosed a release sheet for releasing laminates from one another in a heat and pressure consolidated press pack which release sheet comprises:

a web of paper having a water absorption of at least about 200 seconds, at least one side of which has been sized with a water-soluble salt of an alkaline earth metal or earth metal in an amount sufficient to provide a solids content of said salt distributed throughout the sized surface of said web ranging from about 0.001% to about 10%, by weight, based on the dry weight of the sized web, and then coated on its sized side with a film of a mixture of a salt of alginic acid and a triglyceride, lecithin or hydrolyzed lecithin.

Additionally, the instant invention comprises a method for releasing laminates from one another in a heat and pressure consolidated press pack which comprises:

(1) arranging a plurality of thermosetting synthetic resin-impregnated fibrous core sheets in superimposed relationship in groups of at least two stacks, (2) separating said stacks from one another with a separator sheet comprising a web of phenol-formaldehyde resin impregnated paper having a water absorption of at least about 200 seconds, at least one side of which has been sized with a water-soluble salt of an alkaline earth or earth metal in an amount sufficient to provide a solids content of said salt distributed throughout the sized surface of said web ranging from about 0.001% to about 10%, by weight, based on the dry weight of the sized web, and then coated on its sized side with a film of a mixture of a salt of alginic acid and a triglyceride, lecithin or hydrolyzed lecithin.

(3) consolidating said stacks of core sheets by the application of heat and pressure thereto, and (4) separating the resultant laminates from one another at the locus of said separator sheet.

Among the more common of the alkaline earth metals and earth metals from which the salts used in the practice of the present invention are derived are magnesium, calcium, strontium, barium and aluminum. A wide variety of salts of the alkaline earth and earth metals may be employed and, in fact, any salt or mixture of salts which is sufficiently soluble in water to provide a solution which, in turn, will be sufficiently concentrated to permit sizing of the paper web with the necessary amount of alkaline earth or earth metal salt can be used. A partial listing of such salts is exemplified by the calcium salts, including calcium chloride, calcium bromide, calcium iodide, calcium acetate, calcium bromate, calcium ferricyanide, calcium nitrate, calcium thiocyanate and the like. Magnesium, potassium, sodium, lithium, barium etc. can also be used to form such salts.

The paper which is used in the practice of this invention is preferably a corrugating medium kraft paper (made from reclaimed pulp) having a water absorption of at least about 200 seconds, preferably from about 400 to about 1600 seconds, as determined by TAPPI Method T492-SM-60; 1960. This paper, which is well known to those skilled in the paper-making industry, is generally utilized to produce corrugated boxes, separators etc. having good water-resistance. It is phenol-formaldehyde resin free and is rendered of low water-absorbability by treatment with chemicals i.e. interior sizes, or possesses the low water-absorbability, as prepared, due to the fibers used for its production. Alternatively, a paper with a water absorption of less than 200 can be used herein if its water absorption is increased to over 200 such as by impregnating with a phenolic resin.

A preferred method of preparing a separator sheet to be used in the practice of the process of the present invention involves first sizing the above-described paper web with an aqueous solution of one of the aforementioned alkaline earth or earth metals salts; using such methods as dipping, roll coating, spraying, gravure printing cylinder and the like, in one or several passes to give a solids content of the salt distributed on the surface of the paper of from about 0.001% to about 10% by weight, and preferably from about 0.01% to about 0.1%, by weight based on the dry weight of this sized paper. One or, preferably, both sides of the paper can be sized by this method.

Following the sizing treatment, the paper web is preferably dried to a low moisture content, e.g., less than about 8%, by weight, based on the dry weight of the paper, and then coated, e.g., by dipping, spraying, reverse roll or, preferably, with a gravure printing cylinder on the sized side or sides with a mixture of an alginate salt and a triglyceride, lecithin or hydrolyzed lecithin. However, the wet, alkaline earth or earth metal salt-sized paper web need not be dried prior to being coated with the alginate salt mixture as long as it is not alginate coated by dipping or passing it through a bath containing the alginate salt mixture because passing a wet, sized paper web through an alginate salt mixture bath will usually cause the alginate salt to coagulate. Where the sized web is not dried before being coated with the alginate salt mixture, coating can be accomplished by such methods as spraying, knife coating, gravure printing and the like.

Whether the sized paper is wet or dry, the dried alginate salt mixture is applied as a film thereto at a concentration of at least 0.5 lbs. per ream and preferably 0.6–0.8 lbs. per ream. Among the alginates which can be employed are lithium alginte, sodium alginate, potassium alginate, iron alginate, ammonium alginate and the like, as well as mixtures thereof. These alginates are readily available commercially and come in a plurality of forms, most being aqueous solutions having viscosities which will vary significantly with the concentration of alginate solids therein. In practicing the present invention, about 1–7% aqueous alginate salt solutions having viscosities ranging from about 5 centipoises to about 1000 centipoises at 25° C. are suitable. In practicing the present invention about 0.25% to about 1.5%, by weight, based on the total weight of the mixture, of the triglyceride, lecithin or hydrolyzed lecithin, is added to the alginate solution. The amounts of triglyceride, lecithin or hydrolized lecithin set forth above are merely those practical and higher or lower amounts may be used herein, increased amounts giving better release properties where smaller amounts are not satisfactory. Generally, the triglyceride is a triglyceride linked with a long chain fatty acid and containing O=P—O— linkages.

Typical triglycerides are those phosphate esters of triglycerides represented by either of the following structural formulae;

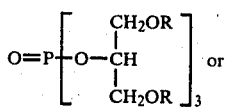 (I)

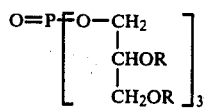 (II)

wherein R is a long, chain, saturated or unsaturated fatty acid of 8 or more carbon atoms.

The lecithins are known materials and are generally described as monoaminomonophosphatides of the structure

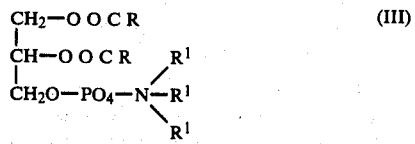 (III)

wherein R is as described above and $R^1$ is an alkyl radical of 1-8 carbon atoms, inclusive. Hydrolysis of these materials results in formation of hydrolyzed lecithin as is known.

After being coated with the alginate salt mixture, the paper web is dried, preferably at elevated temperatures using a forced hot air drying oven, infrared heating means, or the like, to a desired moisture content, e.g., a moisture content of less than about 8%, by weight, based on the total weight of the dried paper. The paper is then ready for use as a separator sheet.

Where the separator sheet is coated on only one side with the mixture of alginate salt, it will become an integral part of one of the laminates which it separates. On the other hand, where the separator sheet is coated on both sides with an alginate salt mixture, it will be removed as such.

More frequently, a pair of sheets coated on one side only with the alginate salt mixture, rather than a single sheet, is used in separating laminating assemblies and releasing the individual laminates. In using such a pair of sheets, their alginate-coated surfaces will be positioned face-to-face in direct contact with one another i.e. the laminates will be back-to-back. Thus, upon separation of the pair of laminates, the respective separator sheets remain an integral part of the laminates to which they adhere on their uncoated sides.

The backs of laminates separated by means of the novel process described herein are usually smoothed down, e.g., by sanding, when the back of the laminate is coated with the alginate salt mixture.

In order that those skilled in the art may more fully understand the inventive concept presented herein, the following examples are set forth. These examples are given solely by way of illustration and should not be considered as expressing limitations unless so set forth in the appended claims. All parts and percentages are by weight unless otherwise stated.

TEST PROCEDURE

To obtain release data, samples were prepared in each of the following configurations and tested using a cling test to test the ease at which the release sheets can be stripped from one another. Preparation of test specimens are done as outlined below. The components of the samples are set forth in Example 1.

| SAMPLE A | SAMPLE B |
|---|---|
| Plate | Plate |
| Print Sheet | Print Sheet |
| } Core Sheets | } Core Sheets |
| Release Sheet | Release Sheet |
| Release Sheet | Release Sheet |
| } Core Sheets | Plate |
| Print Sheet | |
| Plate | |

The cling test is then performed in the following manner:

Using a sharp knife, a slit is made from the upper (uncoated) surface of the release sheet as it yet remains on the pressed laminate and before any effort has been made to disengage it from the laminate. The slit is cut along a straight line using a metal rule as guide for a distance of 10 inches. From one end of this slit, a second slit is cut for 10 inches in a direction perpendicular to the first slit. At the point of intersection of these slits, a small flap is raised by the insertion of the knife edge and the paper is peeled from the laminate along a line bisecting the angle between the two slits, that is, along a line at 45° to the original slits. When about 1.5 inches has been so lifted, a spring type paper clip is attached to the paper flap and the clip allowed to close so that it holds the paper firmly. A spring balance capable of reading up to 250 grams is attached to the paper clip and the stripping of the paper continued along the direction of the bisector. As the paper is stripped back, the line along which peeling occurs is approximately perpendicular to the bisector and increases in length as peeling is continued. At the point where the paper-laminate contact line is 5 inches in length, the force required to continue peeling is noted on the balance.

EXAMPLE 1A

A continuous roll of a commercially available 78 lb. basis weight (3,000 sq. ft. ream) corrugating medium kraft paper free of phenol-formaldehyde resin and having a water absorption of 400 seconds (as determined by T-462-SM-60; TAPPI) is fed at 175 ft./min. through and in contact with a series of rotogravure cylinders of a conventional multistation gravure printing machine. At the first printing station, a 10% aqueous calcium chloride solution is applied to the surface of the paper by means of a 110 line Q12 cylinder which is uniformly etched to an average depth of about 0.0046 inch. The web is then immediately passed through a dryer for the removal of solvent and thereafter through a second printing station. An aqueous mixture of 3% sodium alginate and 0.5% of a commercially available phosphate ester of a triglyceride (N2-3.19%; C-36.18%; H-6.31%; P-10.31%; O-48.01%) is applied on top of the salt sizing by means of a 35 line Q4 cylinder which is etched to an average depth of 0.008 inch. The alginate mixture precipitates on contact with the salt and forms a uniform, shiny coating of about 0.75 lbs./3,000 sq. ft. (dry basis). The web is then dried to a moisture content of 6% volatile and cut to size.

EXAMPLE 1B

A laminating assembly is prepared by stacking, in superimposed relationship, a commercially available melamine-formaldehyde resin-impregnated alpha-cellulose overlay sheet, a commercially available melamine-formaldehyde resin-impregnated cellulosic print sheet bearing a wood print design and seven sheets of standard phenolic resin-impregnated core stock.

A second, identical assembly is prepared in the same manner. Then, a separator sheet, prepared as described in Example 1A, with its alginate-mixture coated side facing out is positioned below the last core sheet in each of the two laminating assemblies. The two assemblies are then placed together so that the alginate-mixture coated sides of their respective separator sheets face one another. Polished press plates are placed next to the overlay sheet member of each laminate to sandwich the pair of back-to-back assemblies between the press plates and the entire assembly is then inserted into a laminating press and consolidated at a temperature ranging from 135° C. to 142° C. under a pressure of 1400 lbs./in.$^2$ for 20 minutes. Following lamination, the back-to-back laminating assemblies are cooled to room temperature and removed from the press. The two laminates are easily separated at the locus of the separator sheets. The cling strength, determined as set forth above, is 70 grams.

EXAMPLE 2 (Comparative)

All essential details are repeated as in Example 1A and 1B with the exception that the triglyceride is omitted. The cling strength is 147 grams.

EXAMPLE 3

All essential details of Example 1A and 1B are repeated except that an equivalent amount of a commercially available hydrolyzed lecithin is used in place of the triglyceride. Cling strength is 27 grams.

EXAMPLE 4 (Comparative)

All essential details of Example 1A and 1B are repeated except that an equivalent amount of calcium stearate is used instead of the triglyceride. The alginate mixture solution kicked out in the graining machine pan.

EXAMPLE 5 (Comparative)

All essential details of Example 1A and 1B are repeated with the exception that a commercially available flourcarbon release agent in an equivalent amount is used in place of the triglyceride. Cling strength measurement is over 250 grams.

EXAMPLE 6 (Comparative)

All essential details of Example 1A and 1B were repeated with the exception that 115 lb./3000 ft.$^2$ ream saturating kraft paper with a water absorption of 15 seconds is used in lieu of the corrugating type paper. Cling strength results are over 250 grams.

EXAMPLE 7 (Comparative)

Example 6 is repeated in all essential details with the exception that the triglyceride is omitted. No cling strength measurements can be obtained as the sample completely adhered together.

EXAMPLE 8

Example 1A and 1B is repeated in all essential details with the exception that a 115 lb./3000 ft.$^2$ ream kraft paper impregnated with a phenolic resin to a 30% resin level and a 5% volatile level is used in place of the corrugating paper. Water absorption for this sheet is 210 sec. Cling strength results are 70 grams.

EXAMPLE 9 (Comparative)

Example 8 is repeated in all essential details with the exception that the triglyceride is omitted from the alginate solutions. Cling strength measurement is 83 grams.

EXAMPLE 10 (Comparative)

Example 1A and 1B is repeated in all essential details with the exception that a 115 lb./3000 ft.$^2$ kraft paper which is first sized with a 10% CaCl$_2$ solution, then treated with a phenolic resin to a 30% resin level with a 5% volatile level and then coated with the alginate mixture is substituted for the corrugating medium. Water absorption for this sheet is 85 sec. No cling strength measurements can be taken as the sheets adhere together.

EXAMPLE 11 (Comparative)

Example 10 is repeated in all essential details with the exception that the triglyceride is omitted from the alginate mixture. No cling tests can be performed as the sheets tightly adhere.

EXAMPLE 12 (Comparative)

The procedure of Example 1A and 1B is again followed except that a commercially available silicone release agent is substituted for the triglyceride. No cling strength measurement can be made because the samples tightly adhere.

EXAMPLE 13

Again following the procedure of Example 1A and 1B except that lecithin in an equivalent amount is used to replace the triglyceride, excellent release of the laminates at the locus of the separator sheets is achieved.

EXAMPLE 14

The procedure of Example 1A and 1B is again followed except that the triglyceride has the formula

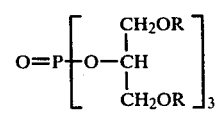

wherein R is the reaction residue of stearic acid. Similar results are achieved.

EXAMPLE 15

When the procedure of Example 14 is again followed except that R is the reaction residue of caprylic acid. Good release is achieved.

EXAMPLES 16 and 17

The procedure of Example 1A and 1B is again followed except that the triglyceride has the formula

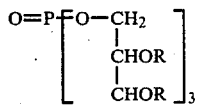

and R is the reaction residue of (16) stearic acid and (17) caprylic acid. In both instances, good release of the laminates is achieved.

EXAMPLE 18

When the procedure of Example 1A and 1B is again followed except that the triglyceride is replaced by a monoaminomonophosphatide of Formula III above wherein (18) R is the reaction residue of palmitic acid and $R^1$ is methyl, (19) R is the reaction residue of oleic acid and $R^1$ is butyl and (20) R is the reaction residue of stearic acid, $R^1$ is ethyl and the phosphatide is hydrolyzed, excellent release of the laminates is achieved in all three instances.

We claim:

1. A separator sheet comprising a web of paper having a water absorption of at least about 200 seconds, at least one side of which has been sized with a water-soluble salt of an alkaline earth metal or earth metal in an amount sufficient to provide a solids content of said salt distributed throughout the sized surface of said web ranging from about 0.001% to about 10%, by weight, based on the dry weight of the sized web, and then coated on its sized side with a film of a mixture of a salt of alginic acid and a triglyceride, lecithin or hydrolyzed lecithin.

2. A separator sheet according to claim 1 wherein said mixture contains a triglyceride.

3. A separator sheet according to claim 1 wherein said mixture contains lecithin.

4. A separator sheet according to claim 1 wherein said mixture contains hydrolyzed lecithin.

5. A separator sheet according to claim 1 wherein said salt of alginic acid is sodium alginate.

6. A separator sheet according to claim 1 wherein said water-soluble salt is a salt of calcium, said salt of alginic acid is sodium alginate, and said mixture contains a triglyceride.

7. A separator sheet according to claim 1 wherein said paper is corrugating medium kraft.

8. A separator sheet according to claim 2 wherein said water-soluble salt is a salt of an alkaline earth metal, and said mixture contains a triglyceride.

9. A separator sheet according to claim 2 wherein said water-soluble salt is a salt of calcium, said salt of alginic acid is sodium alginate and said mixture contains a triglyceride.

10. A separator sheet according to claim 1 wherein said web is phenol-formaldehyde resin free.

11. A separator sheet according to claim 1 wherein said web is phenol-formaldehyde resin impregnated.

* * * * *